United States Patent
Linebrink

(10) Patent No.: US 6,915,639 B1
(45) Date of Patent: Jul. 12, 2005

(54) METHOD AND APPARATUS FOR GAS TURBINE OVER-SPEED PROTECTION

(75) Inventor: Kail Lester Linebrink, Middletown, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/687,886

(22) Filed: Oct. 13, 2000

(51) Int. Cl.[7] .................................. F02C 9/08
(52) U.S. Cl. ....................... 60/776; 60/39.281
(58) Field of Search .............. 60/39.03, 39.281, 60/776

(56) References Cited

U.S. PATENT DOCUMENTS

| 3,946,551 | A | | 3/1976 | Linebrink et al. |
|---|---|---|---|---|
| 4,134,257 | A | * | 1/1979 | Riple .................... 60/39.03 |
| 4,275,558 | A | * | 6/1981 | Hatch et al. ............ 60/39.281 |
| 4,327,294 | A | * | 4/1982 | Smith et al. ............ 60/39.281 |
| 5,301,500 | A | | 4/1994 | Hines |
| 5,394,689 | A | | 3/1995 | D'Onofrio |
| 5,486,997 | A | | 1/1996 | Reismiller et al. |

* cited by examiner

Primary Examiner—Michael Koczo, Jr.
(74) Attorney, Agent, or Firm—William Scott Andes; Armstrong Teasdale LLP

(57) ABSTRACT

A fuel system interface for a gas turbine engine prevents a rotor from over-speeding and receives either an electrically-originated or a mechanically-originated over-speed signal. In the exemplary embodiment, the fuel system interface is coupled to an gas turbine engine fuel shut off valve and to a fuel metering valve to shut off engine fuel after receiving an over-speed condition. As a result, because the fuel system interface acts on both the shut off valve and the fuel metering valve, rotor over-speed protection is facilitated with parallel redundant fuel cutoff devices.

15 Claims, 4 Drawing Sheets

| OVERSPEED SIGNAL | AIRCRAFT SIGNAL | NORMAL ENGINE CONTROL SIGNAL | ENGINE FUEL FLOW |
|---|---|---|---|
| NO | OFF | OFF | NO |
| NO | OFF | ON | NO |
| NO | ON | OFF | NO |
| NO | ON | ON | YES |
| YES | OFF | OFF | NO |
| YES | OFF | ON | NO |
| YES | ON | OFF | NO |
| YES | ON | ON | NO |
| | | | |

METHOD AND APPARATUS FOR GAS TURBINE OVER-SPEED PROTECTION

BACKGROUND OF THE INVENTION

This invention relates generally to gas turbine engine rotors and, more particularly, to fuel system interfaces used to prevent rotor over-speeds.

Gas turbine engines typically include over-speed protection systems that provide rotor over-speed protection. Typically the over-speed protection systems either hold rotor speed below critical rotor speeds or shut off fuel flow with an electronic signal. One type of known protection system receives over-speed signals from mechanical speed sensors. The mechanical speed sensors include rotating flyweight sensing systems that indicate an over-speed condition as a result of the rotor rotating above the normal operational maximum speeds, yet below the structural failure limits. The flyweight sensing systems are hydraulically coupled to a bypass valve, such that as the flyweights are forced centrifugally outward, the bypass valve is operated to reduce a differential pressure across a fuel metering valve at a fixed value. Thus, fuel flow to the engine is controlled by the flow area of the metering valve.

Other types of known over-speed protection systems receive over-speed signal information from electronic control sensors. Additional mechanical control sensors derive over-speed conditions as a function of an engine fuel flow pressure. Such systems provide for rapid fuel shutoff and resulting engine shutdown if engine speed exceeds the normal maximum value.

Because the protection systems are non-redundant, over-speed protection system architecture varies depending on whether the protection system receives a signal from an electrically or mechanically controlled system. Because of the various system architectures, an elapsed time for the protection system to react to an over-speed condition may vary depending on the type of sensing system used to detect the over-speed condition and a location of the sensing system sensors relative to the protection system.

BRIEF SUMMARY OF THE INVENTION

In an exemplary embodiment, a fuel system interface for a gas turbine engine prevents a rotor from over-speeding and receives an over-speed signal from either an electrically-originated and/or a mechanically-originated over-speed sensing system. In the exemplary embodiment, the engine includes a fuel system interface including a fuel shutoff shuttle valve, a fuel shutoff valve, a fuel bypass valve, a plurality of selector valves, an aircraft control shutoff valve, and an independent speed sensing system. The fuel shutoff shuttle valve controls fuel flow to the fuel bypass valve and the fuel shutoff valve, and is coupled to the selector valves. The independent sensing system and the aircraft control shutoff valve are coupled to the selector valves. The aircraft control valve and the shutoff shuttle valve provide parallel redundant fuel cutoff devices that each use selector valves that are employed for normal engine operation.

The fuel system interface includes a shutoff shuttle valve that, in operation, stops fuel flow to the engine to prevent the rotor from over-speeding when an over-speed condition is sensed by the independent sensing system. Because the fuel system interface uses selector valves, rapid signal selection is facilitated within the fuel system interface regardless of a physical proximity of the over-speed sensing system to the fuel system interface shutoff shuttle valve. Furthermore priority logic utilized by the over-speed system provides that when the fuel system interface is activated during over-speed conditions, fuel flow can only be initiated when the signal indicative of an over-speed condition is removed.

DETAILED DESCRIPTION OF THE INVENTION

Figures 1, 3:
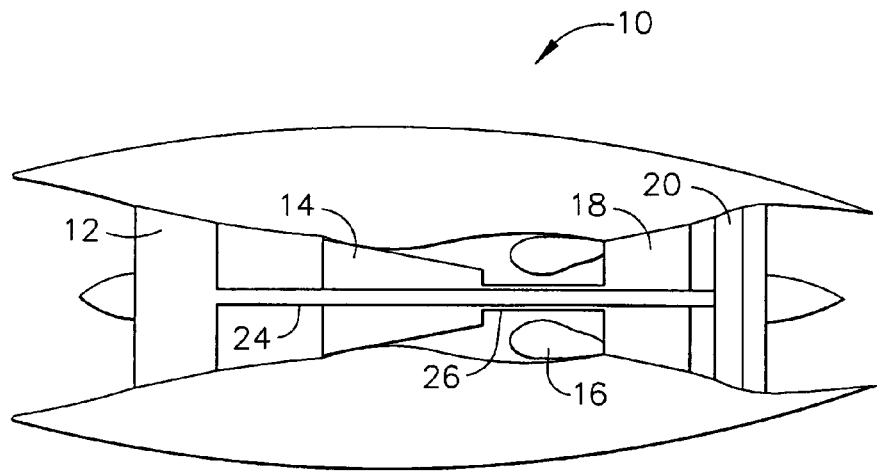
FIG. 1 is a schematic illustration of a gas turbine engine.
FIG. 3 is a priority logic table used with the fuel system interface shown in FIG. 2.

FIG. 1 is a schematic illustration of a gas turbine engine 10 including a low pressure compressor 12, a high pressure compressor 14, and a combustor 16. Engine 10 also includes a high pressure turbine 18, and a low pressure turbine 20. Compressor 12 and turbine 20 are coupled by a first rotor shaft 24, and compressor 14 and turbine 18 are coupled by a second rotor shaft 26. In one embodiment, engine 10 is a GE90 engine available from General Electric Aircraft Engines, Cincinnati, Ohio.

In operation, air flows through low pressure compressor 12 and compressed air is supplied from low pressure compressor 12 to high pressure compressor 14. Compressed air is then delivered to combustor 16 and airflow from combustor 16 drives turbines 18 and 20.

Figure 2:
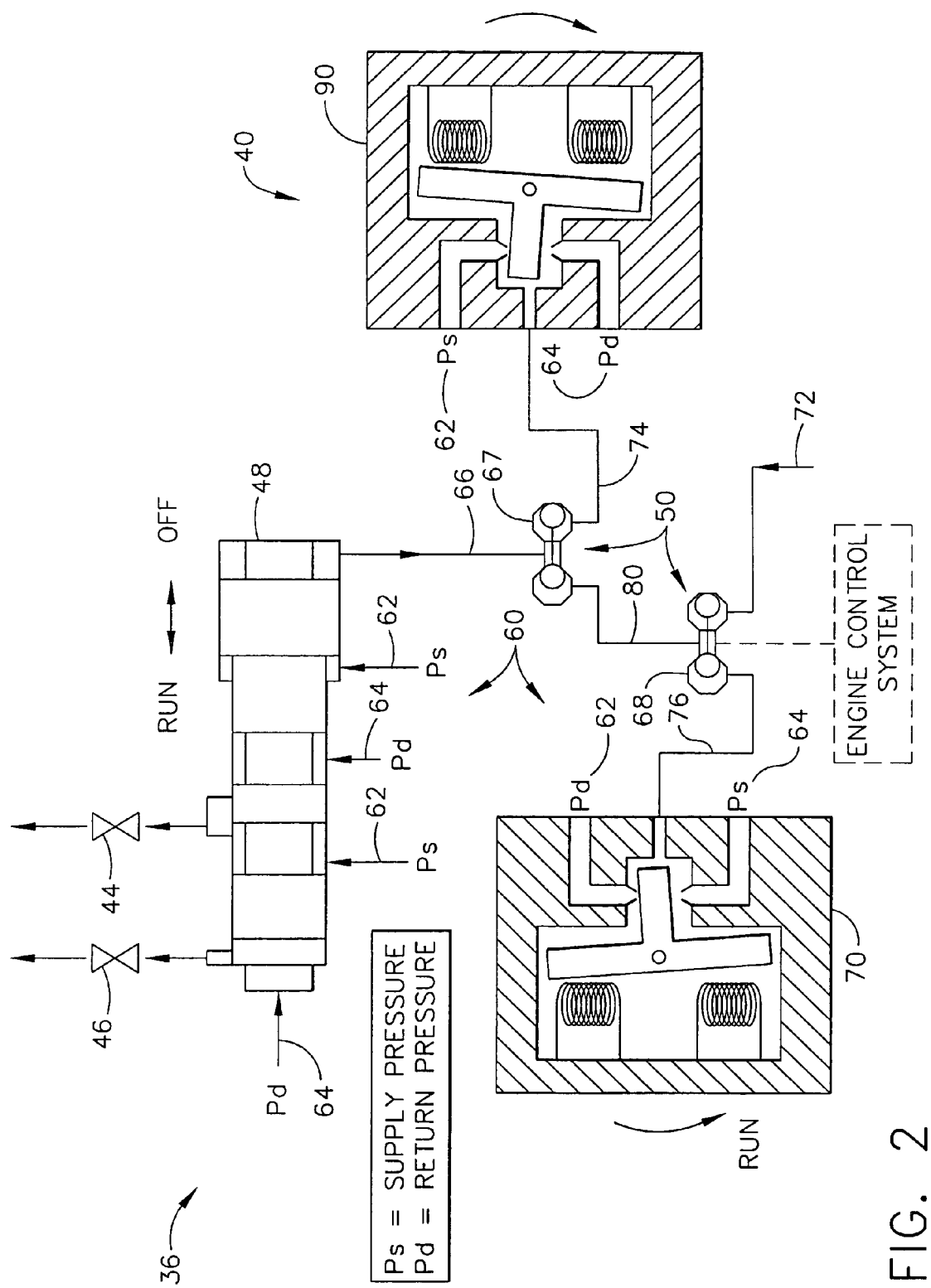
FIG. 2 is a schematic illustration of a portion of the engine shown in FIG. 1 including a fuel system interface receiving a electrically-originated overspeed signal.

FIG. 2 is a schematic illustration of a portion of engine 10 including a fuel system interface 36. FIG. 3 is an exemplary embodiment of a priority logic table 38 that may be used with fuel system interface 36. Fuel system interface 36 prevents engine rotors, such as turbines 18 and 20, from over-speeding when an independent speed sensing system 40 determines normal engine operating limits have been exceeded, and provides for normal operation of engine 10.

Fuel system interface 36 includes a fuel shutoff valve 44, a fuel bypass valve 46, a fuel shutoff shuttle valve 48, and a plurality of selector valves 50. Fuel system interface supplies fuel to engine 10 where it is mixed with air and ignited, producing hot combustion gases used to drive a rotor, such as turbines 18 and 20 (shown in FIG. 1). In one embodiment, fuel bypass valve 46 is a fuel metering valve head regulating valve. Shutoff shuttle valve 48, is connected in flow communication with fuel bypass valve 46 and fuel shutoff valve 44, and operates in either a "RUN" position or in an "OFF" position to control fuel flow through fuel bypass and fuel shutoff valves 46 and 44, respectively.

Fuel system interface 36 also includes a plurality of fuel circuits 60 including a fuel supply pressure circuit 62 and a fuel return pressure circuit 64. Shutoff shuttle valve 48 is connected in flow communication with fuel circuits 60. Fuel flow supplied through fuel supply circuit 62 and fuel return pressure circuit 64 through shutoff shuttle valve 48 varies depending on whether shutoff shuttle valve 48 is selected to operate in the "RUN" or "OFF" position.

Shutoff shuttle valve 48 is coupled to selector valves 50 and receives a signal 66 from selector valves 50 based on logic defined in priority logic table 38. More specifically, shutoff valve 48 receives a "HI/LO" signal 66 from a first selector valve 67, in which the "HI" signal has been predefined as "RUN" and the "LO" signal has been predefined as "OFF", with respect to selected engine operation. "RUN" and "OFF" are produced based the combination of connections between fuel circuits 60 of shutoff valve 48, fuel shutoff valve 44, and fuel bypass valve 46, as well as a position of fuel bypass valve 46 in response to HI/LO" signal 66 received from selector valves 50.

First selector valve 67 is coupled to a second selector valve 68, and selector valves 50 are pressure sensitive devices that select a lowest of two pressure signals inputted for output from selector valves 50. In the exemplary embodiment shown in FIG. 2, selector valves 50 prioritize signal selection 66 from three sources for control of shutoff shuttle valve 48. More specifically, selector valves 50 receive inputs from an aircraft control shutoff valve 70, speed sensing system 40, and a fuel metering system (not shown). In one embodiment, aircraft control shutoff valve 70 is an electro-hydraulic valve.

The fuel metering valve transmits a fuel metering valve interlock signal 72 to selector valves 50. The fuel metering system, speed sensing system 40, and aircraft control shutoff valve 70 transmit a "HI/LO" signal 72, 74, and 76, respectively, and because selector valves 50 select a lowest pressure, any of the fuel metering system, speed sensing system 40, or aircraft control shutoff valve 70 may transmit a "LO" signal to command an "OFF" position of shutoff shuttle valve 48. Conversely, all three signal inputs, 72, 74, and 76 must be "HI" to command a "RUN" position of shutoff shuttle valve 48.

Aircraft control shutoff valve 70 is coupled to fuel circuits 60 and selector valves 50. More specifically, aircraft control shutoff valve 70 is coupled to fuel supply pressure circuit 62 and fuel return pressure circuit 64, such that operating aircraft control shutoff valve 70 provides "HI/LO" signal 76 to second selector valve 68. Second selector valve 68 selects a lowest pressure between signal 76 and fuel metering valve interlock signal 72, and transmits a signal 80 to first selector valve 67.

Speed sensing system 40 includes an electro-hydraulic valve 90 coupled to selector valves 50 and fuel circuits 60. More specifically, speed sensing system 40 is coupled to fuel supply pressure circuit 62 and fuel return pressure circuit 64, such that operating valve 90 provides "HI/LO" signal 74 to first selector valve 67. First selector valve 67 selects a lowest pressure between signal 80 transmitted by second selector valve 68 and signal 74 transmitted by electro-hydraulic valve 90, and transmits signal 66 to shutoff shuttle valve 48. Speed sensing system 40 is also coupled to an engine control system (not shown). In one embodiment, speed sensing system 40 is coupled to an engine control system known as a full authority digital electronic control (FADEC) available from General Electric Aircraft Engines, Cincinnati, Ohio.

During operation, fuel system interface 36 provides access to engine fuel shut off valve 44 and fuel bypass valve 46 with external signals to shut off engine fuel flow due to an over-speed condition. More specifically, fuel system interface 36 stops engine fuel flow to engine 10 by closing fuel shut off valve 44, while fuel bypass valve 46 is opened to stop metered fuel to engine 10 when speed sensing system 40 senses an over-speed condition or as a result of a "LO" fuel metering valve interlock signal 72 or a "LO" signal 76 transmitted from aircraft control shutoff valve 70.

Speed sensing system electro-hydraulic valve 90 is controlled by the engine control system and latches, as illustrated in FIG. 2, when the engine control system signals that a pre-determined rotor speed is exceeded. As a result, shutoff shuttle valve 48 stops fuel flow to engine 10 to prevent the rotor from over-speeding.

Because fuel system interface 36 acts on both fuel metering head regulator or fuel bypass valve 46 and normal fuel shut off valve 44, rotor over-speed protection is provided via parallel redundant fuel cut-off devices using fuel metering devices 50 that are used for normal engine operation.

Because fuel system interface 36 acts on both fuel metering head regulator or fuel bypass valve 46 and normal fuel shut off valve 44, rotor over-speed protection is provided via parallel redundant fuel cut-off devices using fuel metering devices 50 that are used for normal engine operation.

Priority logic table 38 illustrates the conditions under which engine fuel flow may be initiated in light of the various combinations of signals affecting speed sensing system 40 ("Overspeed Signal"), aircraft control shutoff valve 70 ("Aircraft Signal") and shutoff shuttle valve 48 ("Normal Engine Control Signal"). More specifically, priority logic table 38 provides that when fuel system interface 36 is activated, as a result of receiving an over-speed indication 74 from speed sensing system 40, fuel flow can only be initiated when the over-speed indication is removed.

Figure 4:
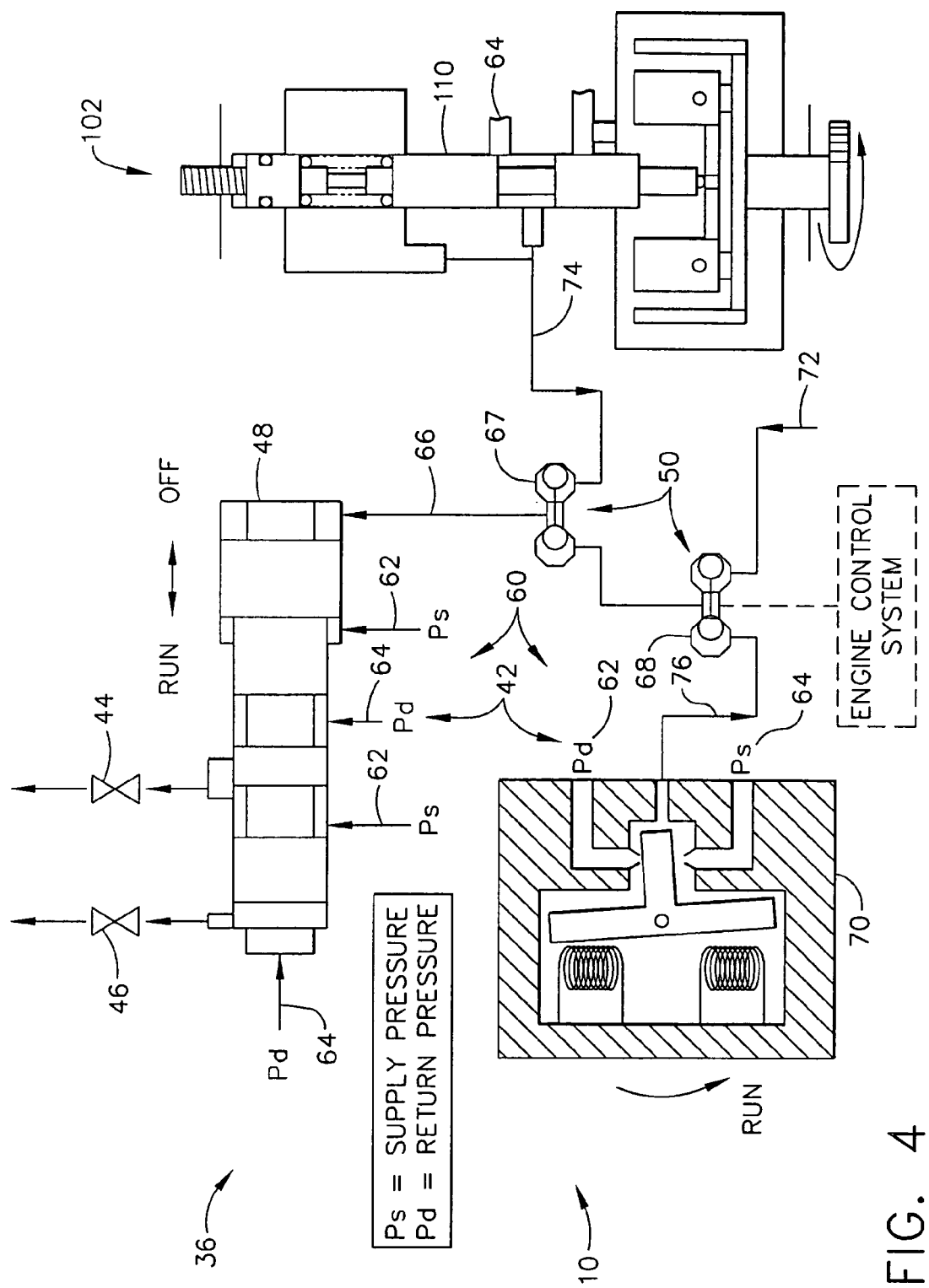
FIG. 4 is a schematic illustration of the fuel system interface shown in FIG. 2 receiving a mechanically-originated overspeed signal.

FIG. 4 is a schematic illustration of fuel system interface 36 receiving a mechanically-originated overspeed signal. Fuel system interface 36 includes a speed sensing system 102 coupled to selector valves 50 and fuel circuits 60. More specifically, speed sensing system 102 is coupled to fuel supply pressure circuit 62 and fuel return pressure circuit 64, such that speed sensing system 102 may limit or stop fuel flow within a portion of fuel supply pressure and fuel return pressure circuits 62 and 64, respectively. Speed sensing system 102 is coupled to a mechanical speed sensor 110 that latches when a pre-determined speed is exceeded. Mechanical speed sensor 110 is known in the art and is shown latched in an over-speed condition.

Figure 5:
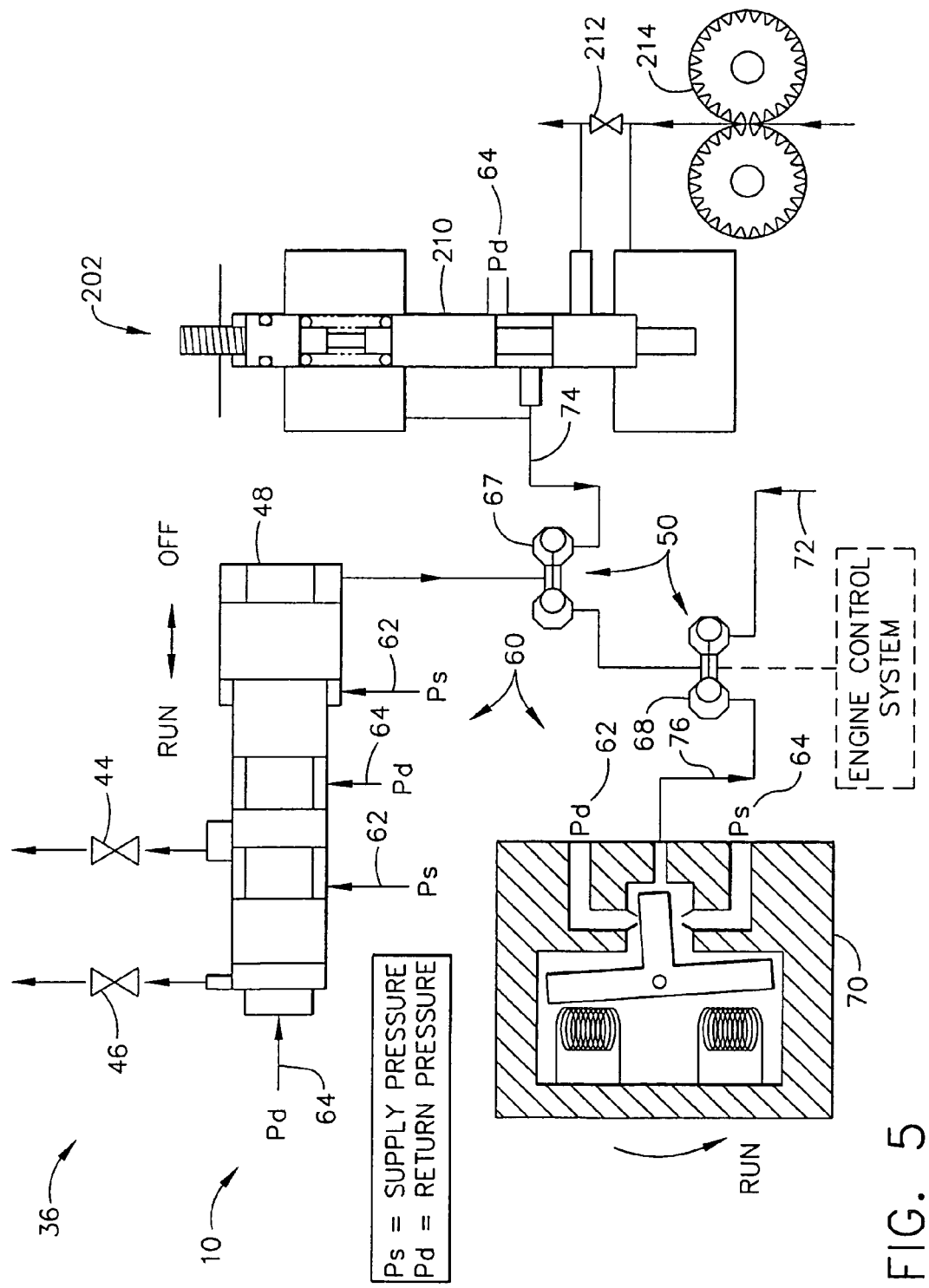
FIG. 5 is a schematic illustration of the fuel system interface shown in FIG. 2 receiving a hydraulically-originated overspeed signal.

FIG. 5 is a schematic illustration of fuel system interface 36 receiving a hydraulically-originated overspeed signal. Fuel system interface 36 includes a speed sensing system 202. Speed sensing system 202 is coupled to selector valves 50 and fuel circuits 60. More specifically, speed sensing system 202 is coupled to fuel supply pressure circuit 62 and fuel return pressure circuit 64, such that speed sensing system 202 may limit or stop fuel flow within a portion of fuel supply pressure and fuel return pressure circuits 62 and 64, respectively.

Speed sensing system 202 includes a sensing valve 210, a sensing orifice 212, and a main fuel pump 214. Sensing orifice 212 derives over-speed information from a pressure generated by main fuel pump 214. Sensing orifice 212 is downstream from main fuel pump 214 and receives a total pump fuel flow exiting main fuel pump 214. Because the total pump fuel flow is proportional to engine speed, the sensed pressure derived by sensing orifice 212 increases with engine rotor speed. Sensing valve 210 latches when an over-speed occurs based on over-speed information derived with sensing orifice 212. Sensing valve 210 is shown latched in FIG. 5 in an over-speed condition.

The above-described fuel system interface is cost-effective and highly accurate. The fuel system interface facilitates a rapid fuel shutoff to prevent rotor over-speeds from occurring when an independent speed sensing system determines normal rotor operating limits have been exceeded. The interface accommodates over-speed signals that originated from electronic or mechanical speed sensors. As a result, the fuel system interface prevents rotor over-speeds in a cost-effective and reliable manner.

While the invention has been described in terms of various specific embodiments, those skilled in the art will recognize that the invention can be practiced with modification within the spirit and scope of the claims.

What is claimed is:

1. A method for assembling a gas turbine engine to prevent rotor over-speeding, said method comprising the steps of:

coupling a fuel system interface including a shutoff shuttle valve to the gas turbine engine such that a selector valve coupled to the shutoff shuttle valve within the fuel system interface is configured to receive an electrically originated over-speed signal inputted from the engine, wherein the fuel system interface is also configured to receive a mechanically originated over-speed signal inputted from the engine; and coupling the fuel system interface shutoff shuttle valve to the fuel system to stop engine fuel flow in response to an overspeed signal received, and based on pre-defined priority selection logic that relates a plurality of different gas turbine engine operating conditions to the received overspeed signal and provides that when the fuel system interface is activated, as a result of receiving an over-speed indication, fuel flow is only initiated when the received overspeed signal is removed.

2. A method in accordance with claim 1 wherein the gas turbine engine includes a fuel metering head regulator and a normal fuel shutoff valve, said step of coupling a fuel system interface further comprises the step of coupling the fuel system interface to the fuel metering head regulator and the normal fuel shutoff valve.

3. A method in accordance with claim 2 wherein said step of coupling the fuel system interface shutoff shuttle valve further comprises the step of coupling the fuel system interface shutoff shuttle valve to the fuel system to prevent engine fuel flow to the fuel metering head regulator and the normal fuel shutoff valve when the fuel system interface is activated as a result of an over-speed signal.

4. A method in accordance with claim 1 wherein said step of coupling a fuel system interface further comprises the step of coupling the fuel system interface to an engine control system.

5. A fuel system interface for a gas turbine engine including a rotor, said interface coupled to the gas turbine engine to receive an electrically originated over-speed signal from the engine, said interface comprising a shutoff shuttle valve for stopping engine fuel flow in response to the over-speed signal received, and based on pre-defined priority selection logic to prevent the rotor from over-speeding, wherein said priority selection logic relates a plurality of different gas turbine engine operating conditions to the overspeed signal, and provides that when said fuel system interface is activated, as a result of receiving an over-speed indication, fuel flow is only initiated when the over-speed signal is removed.

6. A fuel system interface in accordance with claim 5 wherein the engine includes a fuel metering head regulator, said interface coupled to the fuel metering head regulator.

7. A fuel system interface in accordance with claim 5 wherein the engine includes a normal fuel shutoff valve, said interface coupled to the normal fuel shutoff valve.

8. A fuel system interface in accordance with claim 5 wherein said interface further configured to receive an electrical signal originating from an engine control system.

9. A fuel system interface in accordance with claim 5 wherein the engine includes a fuel metering head regulator and a normal fuel shutoff valve, said interface coupled to the fuel metering head regulator and the normal fuel shutoff valve.

10. A fuel system interface in accordance with claim 9 wherein said interface further configured such that engine fuel flow to the fuel metering head regulator and the normal fuel shutoff valve is prevented when said fuel system interface is activated as a result of an over-speed signal.

11. A gas turbine engine comprising:

a rotor;

a fuel delivery system configured to supply fuel to said engine for operating said rotor; and a fuel system interface coupled to said fuel delivery system and comprising a selector valve coupled to a shutoff shuttle valve, said selector valve configured to receive a mechanically originated over-speed signal from the engine, said shutoff shuttle valve configured for stopping engine fuel flow in response to the over-speed signal received, and based on pre-defined priority selection logic to prevent said rotor from over-speeding, wherein said priority selection logic relates a plurality of different gas turbine engine operating conditions to the overspeed signal, and provides that when said fuel system interface is activated, as a result of receiving an over-speed indication, fuel flow is only initiated when the over-speed signal is removed.

12. A gas turbine engine in accordance with claim 11 wherein said fuel delivery system comprises an engine fuel shut off valve and a fuel metering valve head regulating valve.

13. A gas turbine engine in accordance with claim 12 wherein said fuel system interface coupled to said engine fuel shut off valve and a fuel metering valve head regulating valve.

14. A gas turbine engine in accordance with claim 11 wherein said fuel system interface further configured to receive an electrical signal originating from an engine control system.

15. A gas turbine engine in accordance with claim 11 wherein said fuel system interface further configured such that when said fuel system interface activated as a result of sensing an over-speed signal, fuel flow to said engine prevented until the over-speed signal is removed.

* * * * *